United States Patent [19]

Gabor

[11] 3,723,980

[45] Mar. 27, 1973

[54] TEMPERATURE COMPENSATION SYSTEM FOR A MAGNETIC DISK MEMORY UNIT

[75] Inventor: Andrew Gabor, Danville, Calif.

[73] Assignee: Diablo Systems, Inc., Hayward, Calif.

[22] Filed: Nov. 15, 1971

[21] Appl. No.: 198,882

[52] U.S. Cl. ..........340/174.1 B

[51] Int. Cl. ..........G11b 5/40

[58] Field of Search ..340/174.1 B, 174.1 C, 174.1 E; 179/100.2 CA, 100.2 P

[56] References Cited

UNITED STATES PATENTS

| | | | |
|---|---|---|---|
| 3,553,662 | 1/1971 | Goss | 340/174.1 C |
| 3,576,454 | 4/1971 | Beach, Jr. | 340/174.1 C |
| 3,576,553 | 4/1971 | Hevtrich | 340/174.1 B |
| 3,191,179 | 6/1965 | Pelech | 340/174.1 E |
| 3,623,120 | 11/1971 | Lichowsky | 340/174.1 C |
| 3,531,789 | 9/1970 | Halfhill et al. | 340/174.1 B |

*Primary Examiner*—Vincent P. Canney
*Attorney*—Paul D. Flehr et al.

[57] ABSTRACT

A temperature compensation system for a magnetic disk memory unit which is removable from a disk drive unit in which the transducer which is part of the track positioning system is located in the same temperature and mechanical environment as the magnetic disks and read/write heads. All active elements are kept at a substantially uniform temperature by proper air flow and temperature changes are compensated for by the use of similar materials in similar locations.

9 Claims, 4 Drawing Figures

TEMPERATURE COMPENSATION SYSTEM FOR A MAGNETIC DISK MEMORY UNIT

BACKGROUND OF THE INVENTION

The present invention is directed to a temperature compensation system for a magnetic disk memory unit which is a portion of a disk drive unit.

The expansion due to temperature changes of a disk or platter of a magnetic disk memory unit and its associated driving unit including read/write heads must be compensated. This is especially critical when a density of 200 circular memory tracks per inch is used. Here, the desired accuracy is approximately 0.0005 inches maximum deviation between the track and read/write head.

In the case of multiple platter memory units control of the tracking of the heads has been provided by preemption of one platter surface for servo control tracks. This system is therefore unusable from a practical standpoint where only one or two platters or disks are available.

Another technique has been the use of a separate temperature sensor along with a responsive control element to compensate a position servo system. This is disadvantageous in adding additional active control elements to an already complicated system.

OBJECTS AND SUMMARY OF THE INVENTION

It is, therefore, a general object of the present invention to provide an improved temperature compensation system for a disk drive.

It is another object of the invention to provide a system which neither sacrifices recording area or adds active control elements.

In accordance with the above objects there is provided a temperature compensation system for a magnetic disk memory unit having a platter of predetermined material mounted on a hub which is rotatable by a drive unit. The drive unit has read/write heads which are positionable over any one of a plurality of tracks on a disk of the memory unit. The drive unit includes a servo system for positioning the heads over a predetermined track. A linear motor is included in the servo system having a linear radial movement relative to the disk. Transducer means are included in the servo system and responsive to the movement of the motor for producing an actual position signal which may be compared with an external reference position signal to control the linear motor. Carriage means couple the linear motor to the heads and the transducer means. The transducer means include a linear scale and a movable pickup head. The scale is substantially composed of the same material as the disk and is mounted within the drive unit at only one end of the scale at a point which lies is substantially the same vertical plane as where the disk is mounted on its hub. The linear scale is also aligned in a radial direction whereby the platter and scale are free to expand in a similar manner. Means are coupled to the carriage for mounting the read/write heads and transducer pickup heads in substantially the same vertical plane.

DETAILED DESCRIPTION OF THE PREFERRED EMBODIMENT

Figure 2:
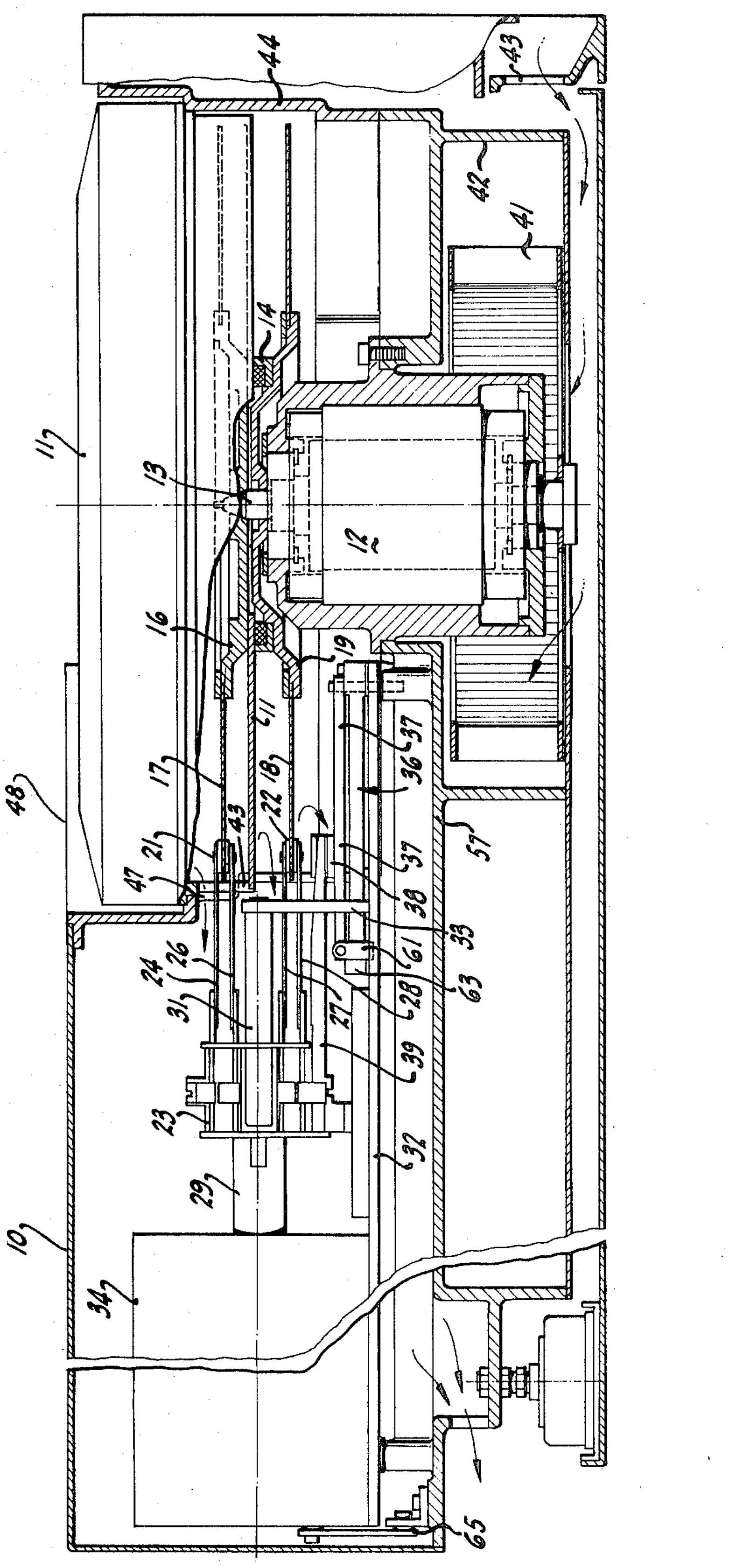
FIG. 2 is a cross-sectional view taken along the line 2—2 of FIG. 1.

Referring first to FIG. 2, there is illustrated a housing 10 which contains a magnetic disk memory unit or cartridge 11 and a drive unit. The drive unit includes a drive motor 12 which drives a spindle 13 which has an annular flange 14. In a manner well known in the art, flange 14 is coupled to a hub 16 of cartridge 11 to which is mounted the magnetic memory platter or disk 17. Also mounted on shaft 13 is a non-removable or fixed platter 18 which is mounted on a hub 19. A pair of read/write heads 21 is provided for removable platter 17 and a pair of read/write heads 22 for fixed platter 18. These heads are positionable over any one of a plurality of memory tracks on the platters. Heads 21 are coupled to a movable carriage 23 by steel support fingers 24 and 26 and heads 22 are coupled to the same carriage by steel support fingers 27 and 28.

Carriage 23 is moved by what is termed a voice coil or moving coil motor. Such a motor is illustrated in patent 3,576,454 issued April 27, 1971 and assigned to IBM Corporation. The moving coil motor includes a moving armature 29 which is affixed to carriage 23 and is slidable on rod 31 which is mounted to frame member 32 by a vertical support member 33. The box 34 indicates the remainder of the moving coil motor which generally includes magnets and wound coils. In any case, under proper control conditions carriage 23 and its associated heads may controllably be moved to any desired track position.

The servo system to control the linear moving coil motor includes a transducer 36 which is responsive to the movement of the carriage 23 for producing an actual track position signal which may be compared with an external reference track position signal to control the motor. Transducer 36 includes a linear scale 37, of rectangular configuration, and a movable pick-up head 38 which is mounted by steel finger 39 to carriage 23. Movement of the pick-up 38 over scale 36 produces a position signal which may control the moving coil motor to move the read/write heads to the proper track position. In general, the transducer scale and pick-up includes a plurality of substantially parallel conductors on their surfaces. Its operation and construction in the servo system is almost identical to the circular transducer illustrated in copending application Ser. No. 157,283 filed June 28, 1971 entitled "Apparatus for the Measurement of Relative Velocity Between Two Relatively Movable Members" filed in the name of Andrew Gabor, the inventor of the present application and assigned to the present assignee. The technique for bringing the read/write heads of the magnetic disk unit to a stop over a predetermined track using the foregoing control system is also disclosed and claimed in application Ser. No. 71,984 filed Sept. 14, 1970 in the name of Andrew Gabor entitled "Apparatus for Controlling the Relative Position Between Two Relatively Movable Members," and also assigned to the present assignee and now U.S. Pat. No. 3,663,880. This patent discloses that the external reference position signal applied to the control system is a difference count indicating to the control system the number of tracks it must pass over to the next stopping point.

The fixed disk 18 along with transducer 36 are all contained within a common bowl structure 44 into which the removable disk or cartridge unit 11 is dropped and centered by spindle 13. At this time, of course, heads 21 and 22 would be retracted.

Disk drive motor 12 is coupled to a fan 41 contained in the scroll case 42 which draws in outside air from inlet 43 and supplies it to the memory unit 11 and other associated parts for both cleaning and temperature compensation as will be discussed below.

Figure 1:
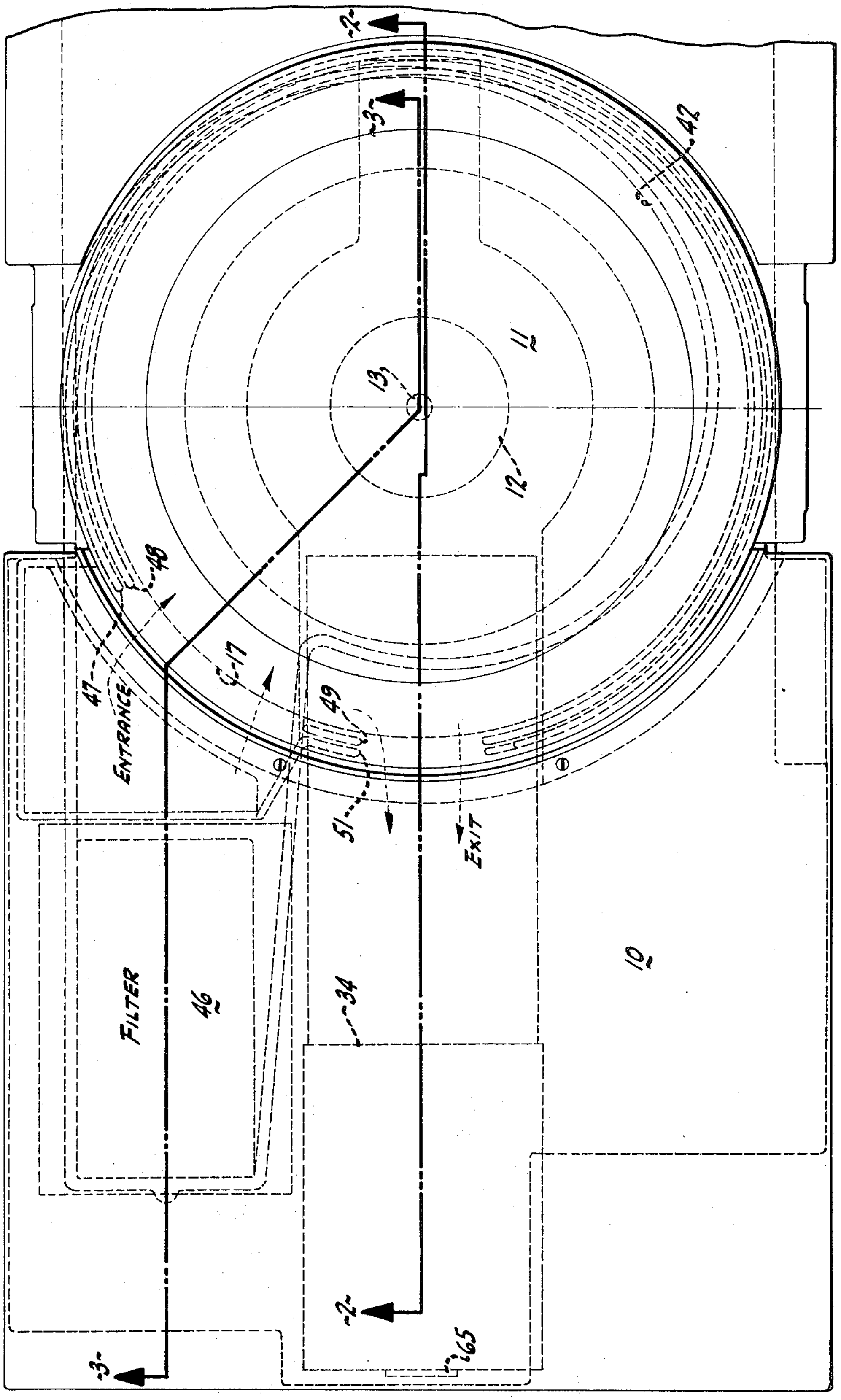
FIG. 1 is a plan view of a drive unit and memory unit embodying the present invention.
Figure 3:
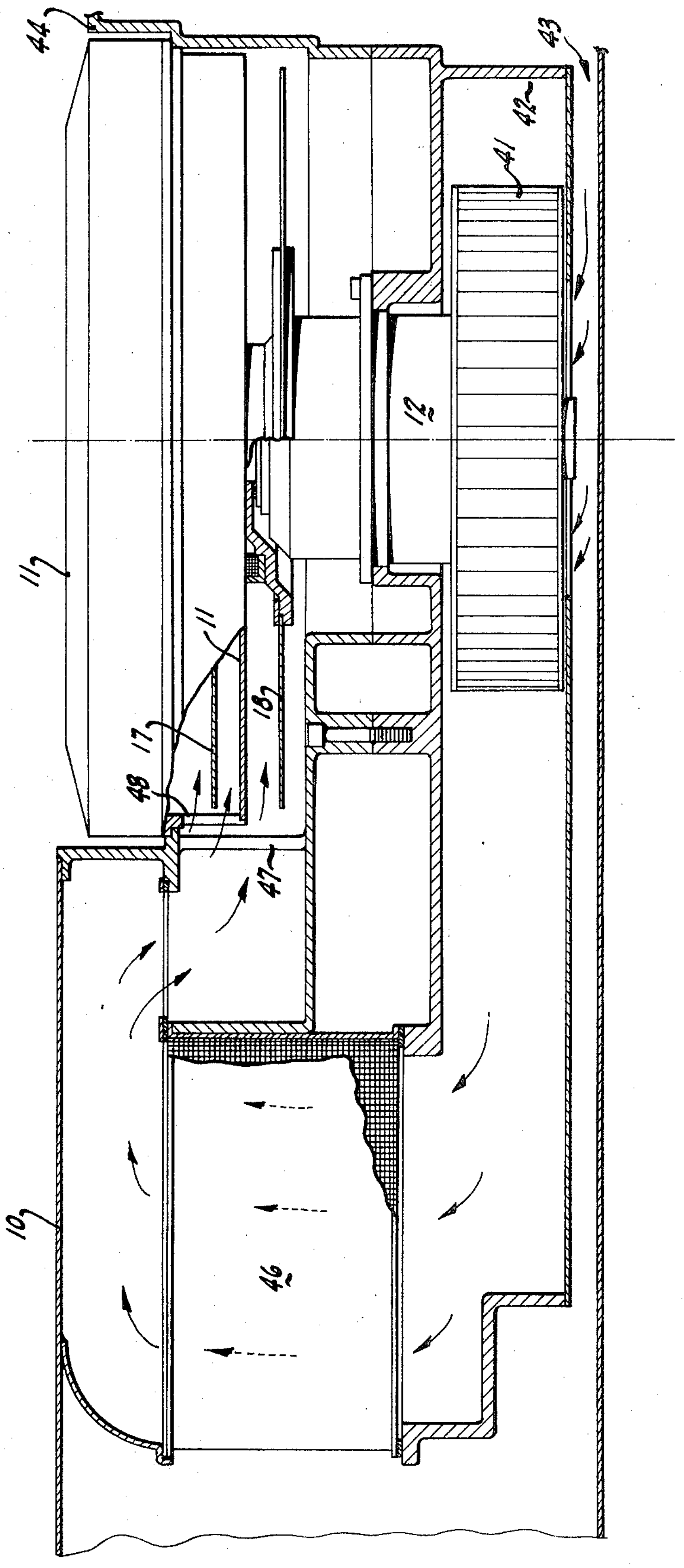
FIG. 3 is a cross-sectional view taken along the line 3—3 of FIG. 1.

FIG. 1 in conjunction with FIG. 3 more fully illustrates the air flow path from inlet 43. This extends as illustrated in FIG. 3 up through the fan wheel 41 through a filter 46, and thence through an opening 47 in bowl 44. Opening 47 is better shown in FIG. 1 and is also coincident with an opening 48 in the disk cartridge 11. Air exits the disk cartridge 11 through an exit 49 and exits the bowl area through opening 51 out to the ambient atmosphere. The arrows in FIG. 2 show such exit of the air which swamps all of the active elements of the disk cartridge and its drive unit which includes the platters 17 and 18, the transducer 36, the head pairs 21 and 22 and the associated structural fingers 24, 26, 27, 28 and 39. In this manner the vertical temperature gradient is minimized. A reasonable horizontal temperature gradient can be tolerated since all relevant components, as will be apparent from the discussion below, will expand at the same rate since they are composed of the same material.

Figure 4:
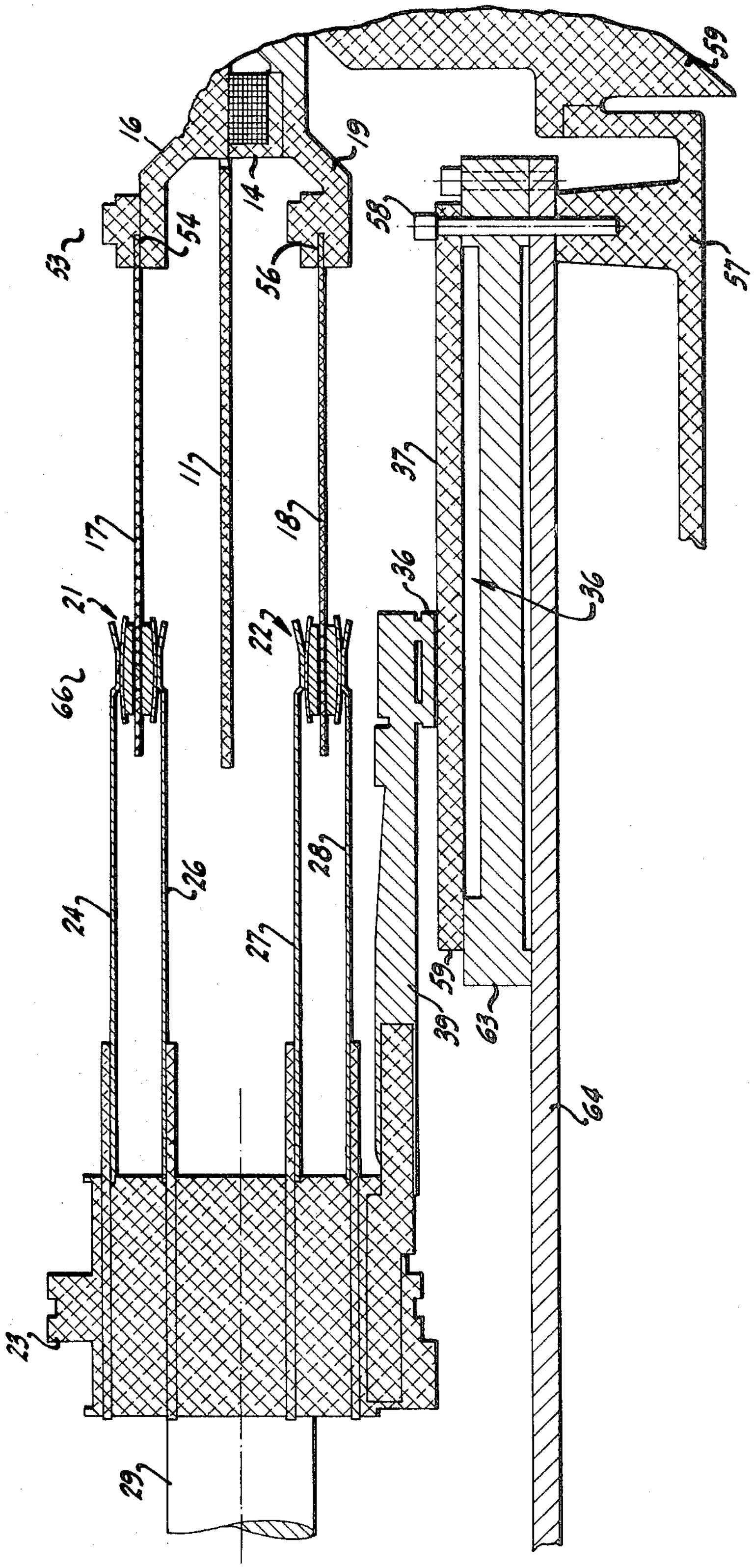
FIG. 4 is an enlarged and simplified portion of FIG. 2.

FIG. 4 is an enlarged view illustrating more fully the active components of the present invention for which temperature variations are critical. Platters or disks 17 and 18 and scale 37 are all constructed of aluminum. Moreover, they are fixedly mounted in the same vertical plane indicated at 53. Specifically, platter 17 is mounted to hub 16 at 54, platter 18 is mounted to hub 19 at 56 and the scale 37 is mounted to base plate 57 by a dowel 58 and screws (not shown). Only one end of scale 37 is fixed; the other end 59 being free to move in a radial direction. However, as illustrated in FIG. 2, there is a hold down unit 61 to prevent vertical fluttering.

Base plate 57 is a portion of the housing 59 for motor 12. The housing 59 is also constructed of aluminum as are hubs 16 and 19. Thus, it is clear that any radial expansion due to changes in temperature will cause scale 37 to expand in the same manner as platters 17 and 18. Scale 37 is also, of course, aligned in a radial direction relative to the rotation of platters 17 and 18. A minimum vertical gradient is assured by the constant flow of air over the active components.

As a further aid to temperature compensation, the transducer pick-up 38 and read/write head pairs 21 and 22 are also mounted in the same vertical plane indicated, for example, at 61 (of course, this plane would move depending on the track which was being recorded upon or read from). Support fingers 24, 26, 27, 28 and 39 are all composed of steel. Moreover, the fingers are coupled to carriage 23 in substantially the same vertical plane as is apparent from observation of FIG. 4. The coupling would normally be by welding. Carriage 23 is composed of essentially aluminum. Thus, it is apparent that any expansion due to temperature changes of the fingers 24, 26, 27 and 28 would be matched by expansion of support finger 39 for transducer pick-up 38. Thus, this insures that the control system positions the read/write head pairs 21, 22 over the proper track in proper alignment.

The criticality of the temperature of the apparatus of the present invention is quite apparent from the following example. Assuming a desired accuracy of 500 microinches as discussed above, aluminum has an expansion rate of $14 \times 10^6$ per degree Fahrenheit per inch. Assuming a ten inch radius for the platters 17 and 18, a 1° F. change in relative temperature would cause a dimensional change of 140 microinches. With a maximum change of 500 microinches allowable the maximum temperature change without compensation is approximately 3.5°.

Scale 37 is rested for stability on a steel bed 63 which in turn is on a steel base plate 64. This base plate forms part of the magnetic return circuit for the moving coil motor. As illustrated in FIG. 2 provision is made at 64 for differential expansion between aluminum and steel base plates.

Thus, the present invention achieves temperature compensation for a magnetic disk memory system by placing the memory disk and its drive unit in the same temperature and mechanical environment. This is achieved by proper placing of critical elements, a common air flow and the use of similar materials in a common functional location. The temperature compensation system of the present invention achieves its objectives without sacrificing either recording area or adding additional control elements to the system.

I claim:

1. A temperature compensation system for a magnetic disk memory unit having a disk of predetermined material mounted on a hub which is rotatable by a drive unit such drive unit having read/write heads which are positionable over any one of a plurality of tracks on a disk of said memory unit said drive unit including a servo system for positioning said heads over a predetermined track said temperature compensation system comprising: a linear motor included in said servo system having a linear radial movement relative to said rotatable disk; transducer means included in said servo system responsive to movement of said linear motor for producing an actual position signal which may be compared with an external reference position signal to control said linear motor; carriage means for coupling said linear motor to said heads and said transducer means; said transducer means including a linear scale and a movable pickup head said scale being substantially composed of the same material as said disk and being fixedly mounted within said drive unit at only one end of the scale which lies in substantially the same vertical plane as where the disk is mounted on its hub said linear scale also being aligned in a radial direction whereby said disk and scale are free to expand in a similar manner; and means coupled to said carriage for mounting said read/write heads and transducer pickup heads in substantially the same vertical plane.

2. A temperature compensation system as in claim 1 together with means for directing a common air flow over said disk and scale to minimize the vertical temperature gradient.

3. A temperature compensation system as in claim 2 where said air flow means includes a common bowl which contains said disk and scale.

4. A temperature compensation system as in claim 1 where said drive unit includes a drive motor mounted in a housing for driving said hub of said memory unit said scale being fixedly mounted to said motor housing said housing and hub being composed of the same material as said disk and scale.

5. A temperature compensation system as in claim 4 in which said material is aluminum.

6. A temperature compensation system as in claim 1 where said means for mounting said read/write heads and transducer pickup includes individual support fingers composed of the same material and affixed to said carriage in substantially the same vertical plane.

7. A temperature compensation system as in claim 6 where said material is steel.

8. A system as in claim 1 where both said linear scale and said pickup head include respectively first and second sets of parallel conductors.

9. Apparatus for accurately controlling the positioning of read/write heads relative to a recording surface in a disk memory unit comprising, a spindle member for supporting a disk record member having a predetermined coefficient of thermal expansion, motor means for rotating said disk member, carriage means having a predetermined coefficient of thermal expansion and movable in a predetermined direction relative to said disk member for supporting and positioning said read/write heads relative to said disk member, motor means for driving said carriage means in said predetermined direction, a first plurality of substantially parallel conductors, a scale member having a coefficient of thermal expansion substantially equal to the coefficient of thermal expansion of said disk member for supporting said first plurality of parallel conductors, means for connecting said scale member at one end thereof in a predetermined relationship relative to said disk member, the opposite end thereof being freely expandable in a similar relationship with said disk member in response to temperature gradients, a second plurality of substantially parallel conductors, a transducer member for supporting at one end thereof said second plurality of parallel conductors, means for connecting said read/write heads to said carriage means, means for connecting said transducer member to said carriage means at the end thereof opposite said conductors with said conductors on said transducer member being in operative relationship with the conductors on said scale member and said transducer member being freely expandable in a similar relationship with said means for connecting said read/write heads in response to temperature gradients, and means responsive to movement of said transducer member relative to said scale member for generating actual position signals indicative of the positioning of said read/write heads relative to said disk member for controlling movement of said carriage means.

* * * * *